(12) United States Patent
Dominguez

(10) Patent No.: US 11,939,783 B2
(45) Date of Patent: Mar. 26, 2024

(54) SYSTEM AND METHOD FOR CARBON FIBER POLE CONSTRUCTION

(71) Applicant: Eddy E. Dominguez, Milpitas, CA (US)

(72) Inventor: Eddy E. Dominguez, Milpitas, CA (US)

( * ) Notice: Subject to any disclaimer, the term of this patent is extended or adjusted under 35 U.S.C. 154(b) by 0 days.

(21) Appl. No.: 18/215,915

(22) Filed: Jun. 29, 2023

(65) Prior Publication Data
US 2024/0003157 A1 Jan. 4, 2024

Related U.S. Application Data

(60) Provisional application No. 63/356,567, filed on Jun. 29, 2022.

(51) Int. Cl.
*B29C 70/32* (2006.01)
*B29L 23/00* (2006.01)
(Continued)

(52) U.S. Cl.
CPC ............. *E04H 12/02* (2013.01); *B29C 70/32* (2013.01); *E02D 27/42* (2013.01);
(Continued)

(58) Field of Classification Search
CPC ............... F03D 13/2005; F03D 13/201; B29L 2031/766; E04H 12/02; B29C 70/32;
(Continued)

(56) References Cited

U.S. PATENT DOCUMENTS 4,359,356 A * 11/1982 Kornbichler .......... B29C 70/382
156/425
4,772,352 A * 9/1988 Kornbichler ........ B29C 53/8008
156/425
(Continued)

FOREIGN PATENT DOCUMENTS

CN 104626602 A * 5/2015
CN 106049960 A 10/2016

OTHER PUBLICATIONS

"Mandrel Filament Moulding of carbon masts," youtube.com. https://www.youtube.com/watch?v=IE1T81Jx3aA [Date accessed: Apr. 29, 2022].
(Continued)

*Primary Examiner* — Brent W Herring
(74) *Attorney, Agent, or Firm* — Bold IP, PLLC; Christopher Mayle

(57) ABSTRACT

A unique carbon fiber structure that achieves the strength and durability of steel tower alternatives at 90% less weight and a lower total installed cost, providing affordable carbon fiber telecommunication towers that are engineered for peak strength to weight performance wherein the carbon fiber structure is a vertical elongated tower body of decreasing area with an internal installation shaft provided therein to house one or more radio base stations wherein the tower may be made of multiple cylindrical or cone shaped hollow segments with a shaved upper portion whereby the segments are created with carbon fiber and fiberglass hoop windings.

2 Claims, 11 Drawing Sheets

(51) Int. Cl.
  E02D 27/42 (2006.01)
  E04H 12/02 (2006.01)
  B29K 263/00 (2006.01)
  B29K 307/04 (2006.01)
  B29L 31/00 (2006.01)
  E02D 7/06 (2006.01)
  E21B 7/02 (2006.01)

(52) U.S. Cl.
  CPC ...... *B29K 2263/00* (2013.01); *B29K 2307/04* (2013.01); *B29L 2023/22* (2013.01); *B29L 2031/766* (2013.01); *E02D 7/06* (2013.01); *E02D 2300/0068* (2013.01); *E21B 7/027* (2013.01)

(58) Field of Classification Search
  CPC ... E02D 27/42; E02D 7/06; E02D 2300/0068; B29K 2263/00; B29K 2307/04
  USPC ................ 52/848, 651.01, 745.17, 40, 843; 156/173, 175, 153
  See application file for complete search history.

(56) References Cited

U.S. PATENT DOCUMENTS

| | | | |
|---|---|---|---|
| RE35,081 E * | 11/1995 | Quigley | B63B 15/0083 428/36.1 |
| 5,513,477 A * | 5/1996 | Farber | E04H 12/02 52/843 |
| 5,779,838 A | 7/1998 | Fellers et al. | |
| 6,453,635 B1 * | 9/2002 | Turner | B29C 70/52 52/848 |
| 6,540,171 B2 * | 4/2003 | Yasui | B29C 53/8016 242/444 |
| 6,955,024 B2 | 10/2005 | Ashton | |
| 7,098,864 B2 | 8/2006 | Ryan | |
| 7,547,371 B2 | 6/2009 | Christensen | |
| 7,628,869 B2 * | 12/2009 | Martin | C22C 38/06 52/848 |
| 7,866,121 B2 | 1/2011 | Polyzois et al. | |
| 8,228,259 B2 | 7/2012 | Hager | |
| 9,651,029 B2 | 5/2017 | Hayden et al. | |
| 9,745,750 B2 | 8/2017 | Holmes | |
| 10,731,372 B1 * | 8/2020 | Nolen | A45F 3/44 |
| 2008/0087371 A1 * | 4/2008 | Friedrich | E04H 12/02 156/166 |
| 2008/0184654 A1 * | 8/2008 | Polyzois | F03D 13/22 52/651.01 |
| 2008/0274319 A1 * | 11/2008 | Berksoy | E04H 12/02 428/36.91 |
| 2009/0211173 A1 * | 8/2009 | Willey | B29C 70/32 156/173 |
| 2009/0266004 A1 * | 10/2009 | Willey | B29C 70/222 264/299 |
| 2009/0324951 A1 * | 12/2009 | Castellani | E04H 12/02 428/401 |
| 2011/0281082 A1 * | 11/2011 | Wilson | B32B 3/266 428/178 |
| 2013/0243989 A1 | 9/2013 | Ridges et al. | |
| 2015/0159635 A1 * | 6/2015 | Hayden | F03D 13/20 290/55 |
| 2018/0016807 A1 | 1/2018 | Chronis | |
| 2019/0119938 A1 | 4/2019 | Sorenson et al. | |
| 2020/0140631 A1 * | 5/2020 | Sorenson | C08K 5/34924 |
| 2021/0404205 A1 | 12/2021 | Elliott et al. | |

OTHER PUBLICATIONS

"Isotruss carbon fiber cell towers support global demand for 5G telecom rollout," compositesworld.com. https://www.compositesworld.com/news/isotruss-carbon-fiber-cell-towers-support-global-demand-for-5g-telecom-rollout [Date accessed: Apr. 29, 2022].

"Obelisk Composite Technology," obeliskcomposite.com. http://obeliskcomposite.com/ [Date accessed: Apr. 29, 2022].

* cited by examiner

SYSTEM AND METHOD FOR CARBON FIBER POLE CONSTRUCTION

CROSS REFERENCE TO RELATED APPLICATIONS

This application claims priority to U.S. Provisional Patent No. 63356567 filed on Jun. 29, 2022 which is incorporated in its entirety.

FIELD OF THE DISCLOSURE

The overall field of this invention relates to telecommunications towers, and more particularly to a carbon fiber tower or composite structures for use in a wireless communication system.

BACKGROUND

Telecommunications towers are where electronic communications equipment and antennae are mounted, allowing the surrounding area to use wireless communication devices like telephones and radios. Prevailing technology for telecommunications towers, whether self-supported or guyed, are typically steel or concrete constructions. These masts are often galvanized using hot dip galvanization, where the steel structure is coated with a layer of Zinc. Steel towers are usually manufactured for a design life between 30-50 years but during this span host a significant number of problems. Developed countries, which already have high internet and mobile penetration, are shifting towards increasingly data intensive media devices such as 4G/LTE and 5G networks. This global expansion requires access to more towers, higher bandwidth and more remote locations. Steel towers are difficult to transport and install onsite. Heavy steel causes safety hazards.

Coated structures are also sensible to mechanical and environmental wear, and lattice steel towers are no exception especially in coastal regions. Steel towers get surface damages during transportation and installation because of weight and other factors, and such damages need to be mended when the tower is installed. There are also many significant hurdles with steel towers depending on the geographic region. In urban areas, real estate owners do not allow heavy, non-aesthetical looking steel towers. In rural areas, logistics & transportation become a major concern, especially those locations reachable only by water or by foot. Thus exists the need for an environmentally friendly composite structure that offers virtually no negative environmental impact, markedly lower density and extreme structural weight reduction compared to steel

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

SUMMARY

Figure 1:
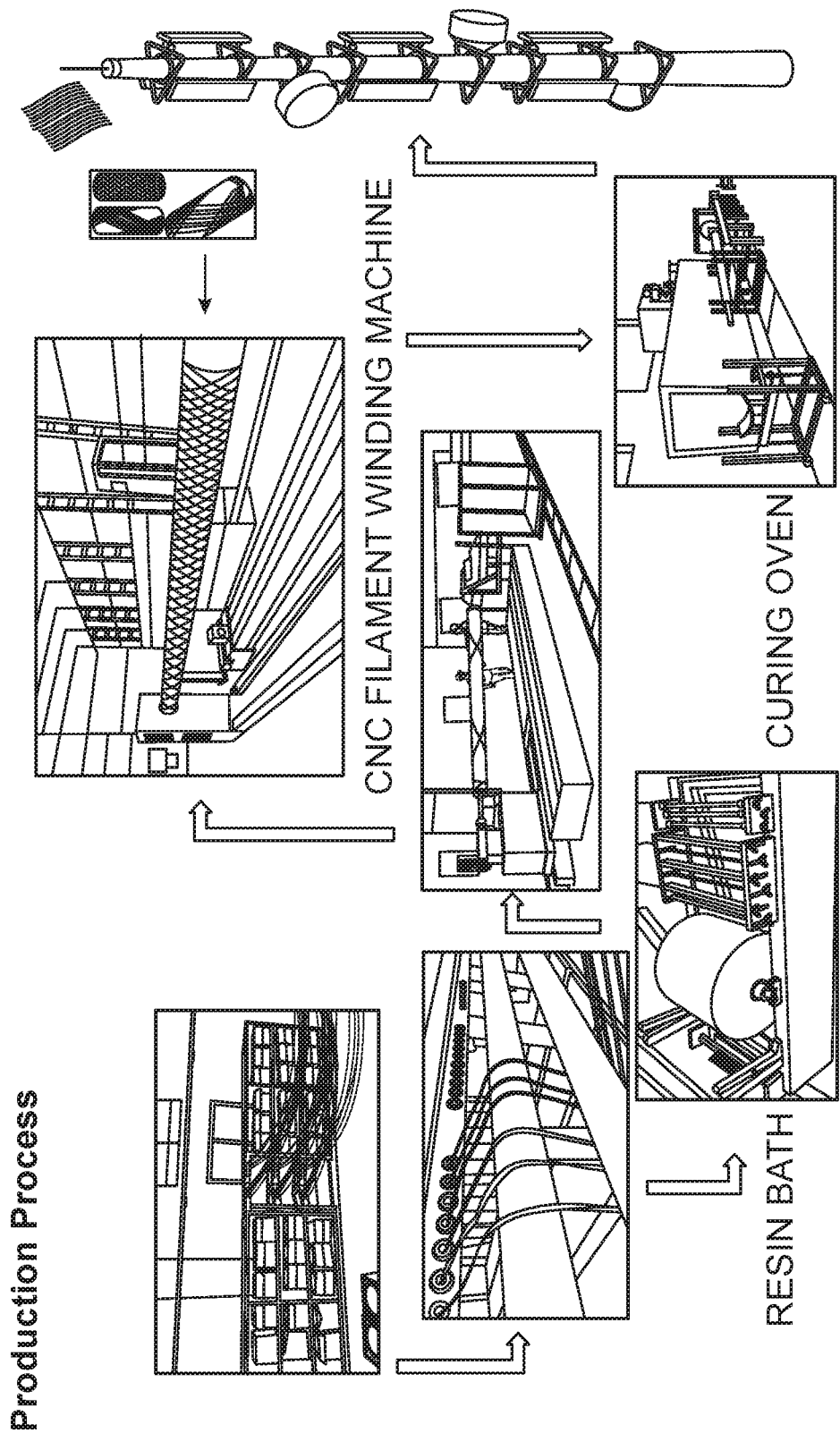
FIG. 1 is an illustration of the production process.
Figure 2:
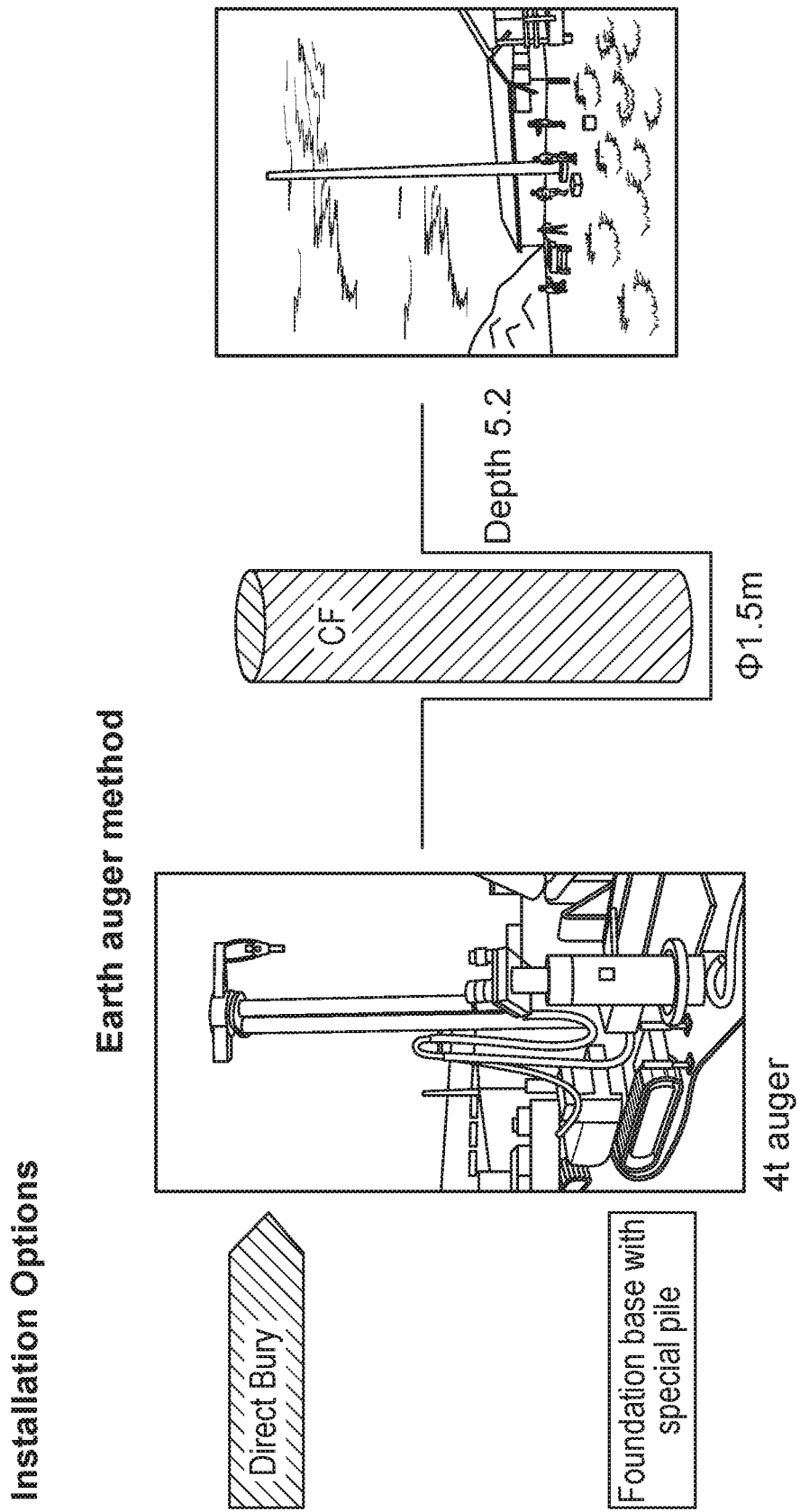
FIG. 2 is an illustration of an installation option.
Figure 3:
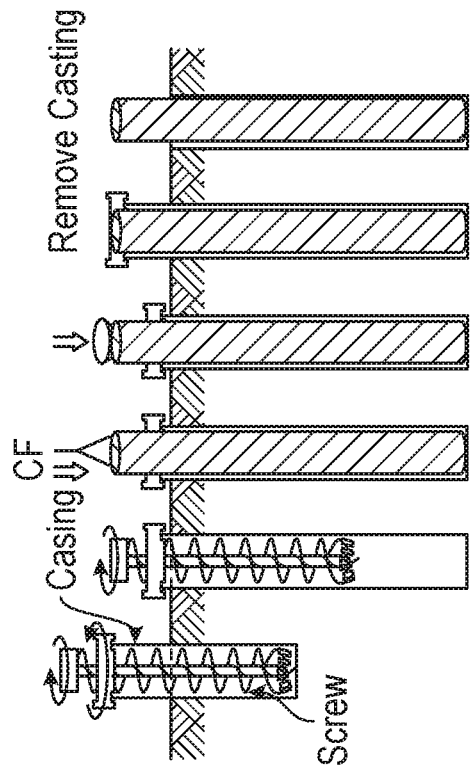
FIG. 3 is another illustration of the installation option.
Figure 3:
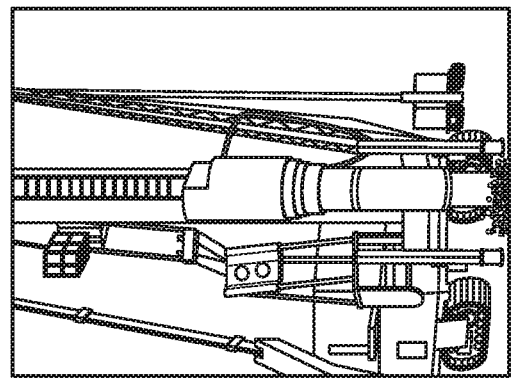
Figure 3:
Figure 4:
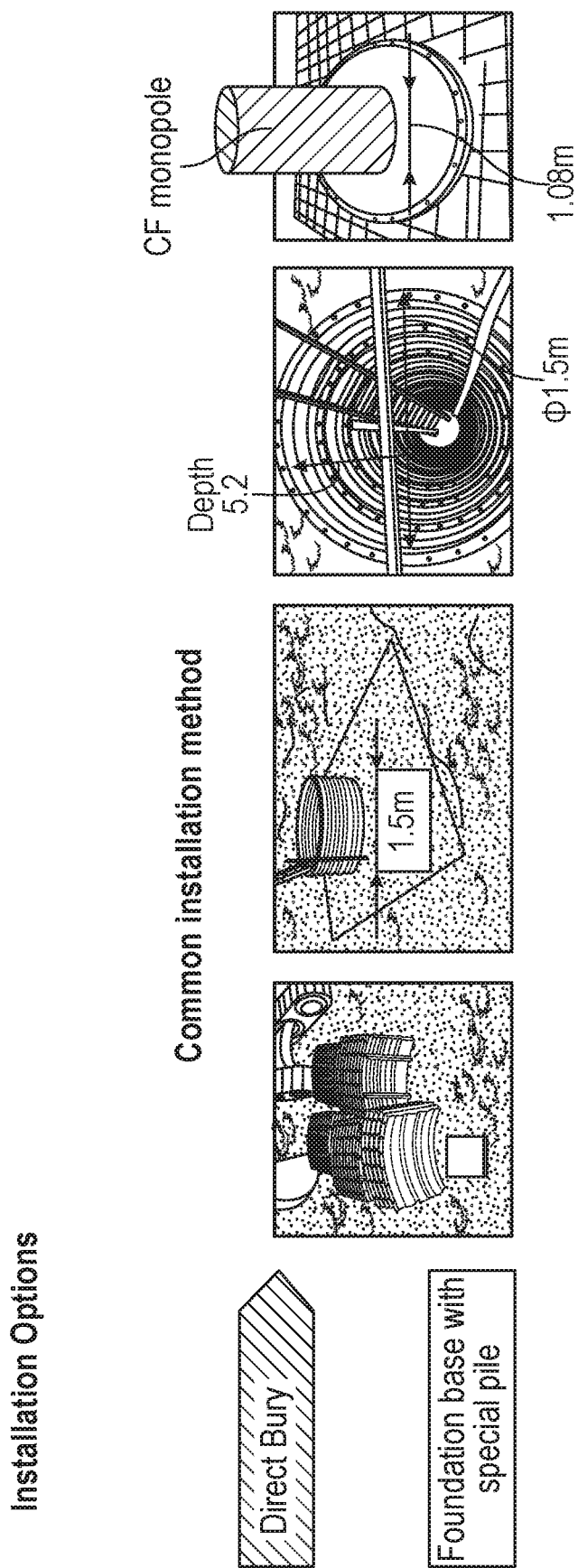
FIG. 4 is another illustration of the installation option.
Figure 5:
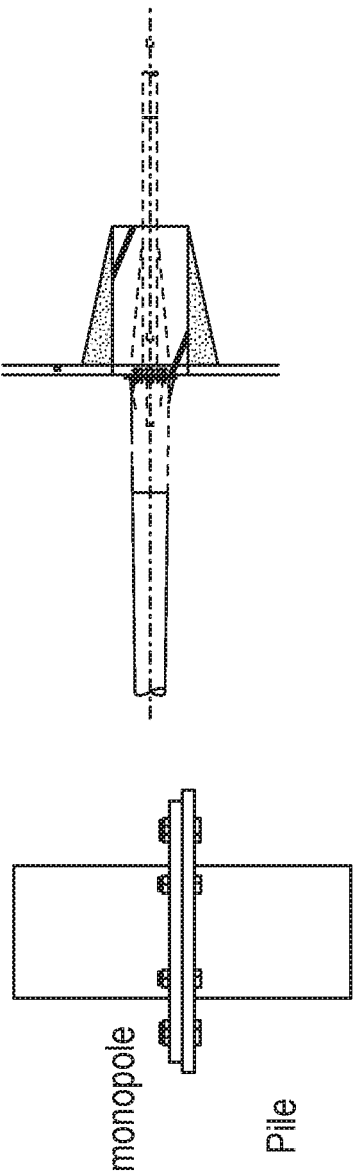
FIG. 5 is another illustration of the installation option.

The present invention provides a unique carbon fiber structure that achieves the strength and durability of steel tower alternatives at 90% less weight and a lower total installed cost. The mass production process provides affordable carbon fiber telecommunication towers that are engineered for peak strength to weight performance. The composite non-corrosive, non-rusting towers are easy to install and transport to remote locations and have lower maintenance than alternatives. The global ecosystem is in favor of light-weight, small carbon footprint, cost-effective towers and our products are the only solution. The tapered monopole series provides a wide array of tower options that are all engineered for unparalleled strength to weight characteristics. The carbon fiber structures provide an aesthetical, lightweight & minimum base width, they are transportation friendly with sections that can be nested inside themselves to optimize transportation & logistical challenges The carbon fiber structures are non-corrosive and last many times longer than steel. The carbon fiber structures are environmentally friendly with virtually no negative environmental impact, markedly lower density and extreme structural weight reduction compared to steel

DETAILED DESCRIPTION

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, and steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The present disclosure is generally drawn to a system and method, according to one or more exemplary embodiments, for a composite carbon fiber based tapered monopole series that is lightweight, durable, strong, and which provides a wide array of tower options that are all engineered for unparalleled strength to weight characteristics. In one or more non-limiting embodiments the attachments or accessories may also be made of the same or similar material. The carbon fiber monopoles provide an affordable composite option to traditional steel towers. The unique design offers incredible performance at a fraction of the weight, significantly reducing logistical costs and lease space. Tapered monopoles may vary in diameter and range in height from 6 meters (20 ft.) to 42 meters (138 ft.) and upwards and provide extreme structural weight reduction compared to steel.

According to one embodiment of the present invention, an antenna tower structure may be an essentially vertical elongated tower body of decreasing area with an internal installation shaft provided therein. The installation shaft is formed to house one or more radio base stations. The tower structure may be made of multiple cylindrical or cone shaped hollow segments.

Segments may be hollow with an inner diameter and aperture passing through segments. Segments may have a bottom surface portion. A sidewall portion extends outwardly and upward from an upper margin of the bottom surface portion whereby the sidewall portion terminates into a top surface portion whereby the top surface portion may be of equal or smaller circumference than bottom surface portion. In some embodiments, the sidewall portion may have no angle or be at any different angle depending on the circumstances needed for the tower being built.

Segments may be created by a filament winding process involving a series of stationary steel mandrels that rotate and carriage arms that travel horizontally up and down the length of the mandrels as illustrated in FIG. 1. The filament winding creates hollow structures of incredible strength. The traveling arm includes a winding eye, which groups rovings of a specific winding pattern of carbon fiber and dispenses them to the mandrel. As the mandrel turns, the rovings wrap around it to form a composite layer over the mandrel's surface. The precise orientation of the carbon fiber when positioned over the mandrel may be at multiple angles such as 0 degrees to 40 degrees but in one or more preferred embodiments 0 to 5 degrees. Before encountering the mandrel, the carbon fiber may be impregnated in a specially designed epoxy resin and hardener, which later solidifies with the carbon fiber to create the final composite material. In some embodiments the carbon fiber may be pre impregnated with epoxy resin.

After the carbon fiber has been positioned on the steel mandrel, the winding eye may then supplement 90 degree hoop winding of fiber glass to surround the ends of the mandrel. Different amounts may be used depending on the situation. The fiberglass will squeeze the resin when put in the oven to consolidate the carbon fiber. This process with a fiberglass hoop winding at 90 degrees yields the necessary consolidation to achieve optimum material properties necessary to meet or exceed telecom structure requirements by regulatory agencies. By weaving continuous rovings of carbon fiber and then fiberglass and embedding them in a resin matrix, the filament winding process results in an optimized product that is perfect telecommunication towers. The fiberglass on the outside of the segments provides electrical effect to prevent corrosiveness when in contact with metal.

After the desired pattern has been executed, the entire assembly of the mandrel and the composite material of carbon fiber and fiberglass is placed in an oven to cure. During this process, the steel mandrel swells inside while carbon fiber doesn't stretch to further consolidate the carbon fiber. When the composite resin is fully cured, the mandrel may be extracted leaving the composite segment and the ends may be cut out leaving a hollow shape.

After this process is completed the top portion may end up thicker so a radially inward extending or shaved down region n may be grinded down or otherwise reduced. The shaved region may have a diameter less than the diameter of the aperture of the segments such that the inner diameter of a second segment may be positioned over a first segment. In use modular segment stacks to make different height poles. The cone shape and shaved region allows the segments to be nested within another when shipping, drastically improving shipping costs and the need for large transportation vessels. Using a slip joint method or other similar methods, multiple segments can be assembled at site whereby installation can be done with hand or machine. The diameter of the segment above *1½ is the area of the shaved segment. In some embodiments it would be a 9 mm wall thickness shaved down to 7.86 mm wall thickness allowing for a perfect fit and a tighter joint with no obstruction During installation carbon fiber towers may be installed in different ways as illustrated in FIG. 2-5. Carbon fiber towers may be directly buried in the ground without foundation or have a foundation base having a special pile that is inserted into the ground and connected to the carbon fiber tower. The general method of excavating a vertical shaft with a screw may be ideal for hard strata with no groundwater. This may be accomplished using a 2-axis coaxial earth auger method with a casing. During operation the user may dig two meters by two meters by five meters and assemble the liner plate from the bottom. In the case of a 40 meter carbon fiber tower the diameter would be 1.5 meters. For the 40 meter carbon fiber tower the depth of the hole may be 5.2 meters and the area around the liner plate may then be refilled. The carbon fiber tower may then be erected and the gap may be filled with concrete. When driving a dedicated foundation pile that is bolted to the carbon fiber tower, a height of 10 meters may be used for general soil and 20 meters may be used for liquified soil.

Initially the carbon fiber towers may be shipped in nested bundles made up of the segments. Depending on the size of the tower, these bundles will be approximately 19 ft. [5.8 m] or 37 ft. [11.3 m] in length. The nested carbon fiber towers may be unloaded using a forklift or boom truck. Because of the lightweight nature, individual carbon fiber tower segments may be unloaded by hand. If a nested tower set contains longer outside modules (i.e., a 5/6, 6/7 or 8), and shorter inside modules (i.e. a 1, 2, 3 or 4), caution should be used as the center of gravity for the nested set will be closer to the base. Prior to unloading towers, it should be ensured that all towers are blocked and that lower rows of towers remain securely strapped and to not release or cut any straps or banding, respectively, until all towers are properly secured. The carbon fiber nested bundles may be secured with a shipping bolt.

To un-nest the modules shipping bolt located at the large end of the nested module set would be removed. This bolt holds all the modules together from a single point. It should be ensured that the nested module set is elevated (wood dunnage is recommended for this purpose) to allow for removal of the bolt and that the shipping bolt is on the bottom of the nested modules to reduce module movement after the shipping bolt is removed and to avoid possible injury. After the shipping bolt is removed, the segments would then be unnested starting with the innermost (smallest) segment first and layout for assembly. For smaller segments, this can usually be accomplished by-hand with two to four crew members. For larger modules, handling with a boom truck is recommended to move modules faster and safer. When un-nesting a segment, it is important that the base of the segment needs to be lifted up during its removal from the nested set to minimize scratching along the length of the segment.

Figure 6:
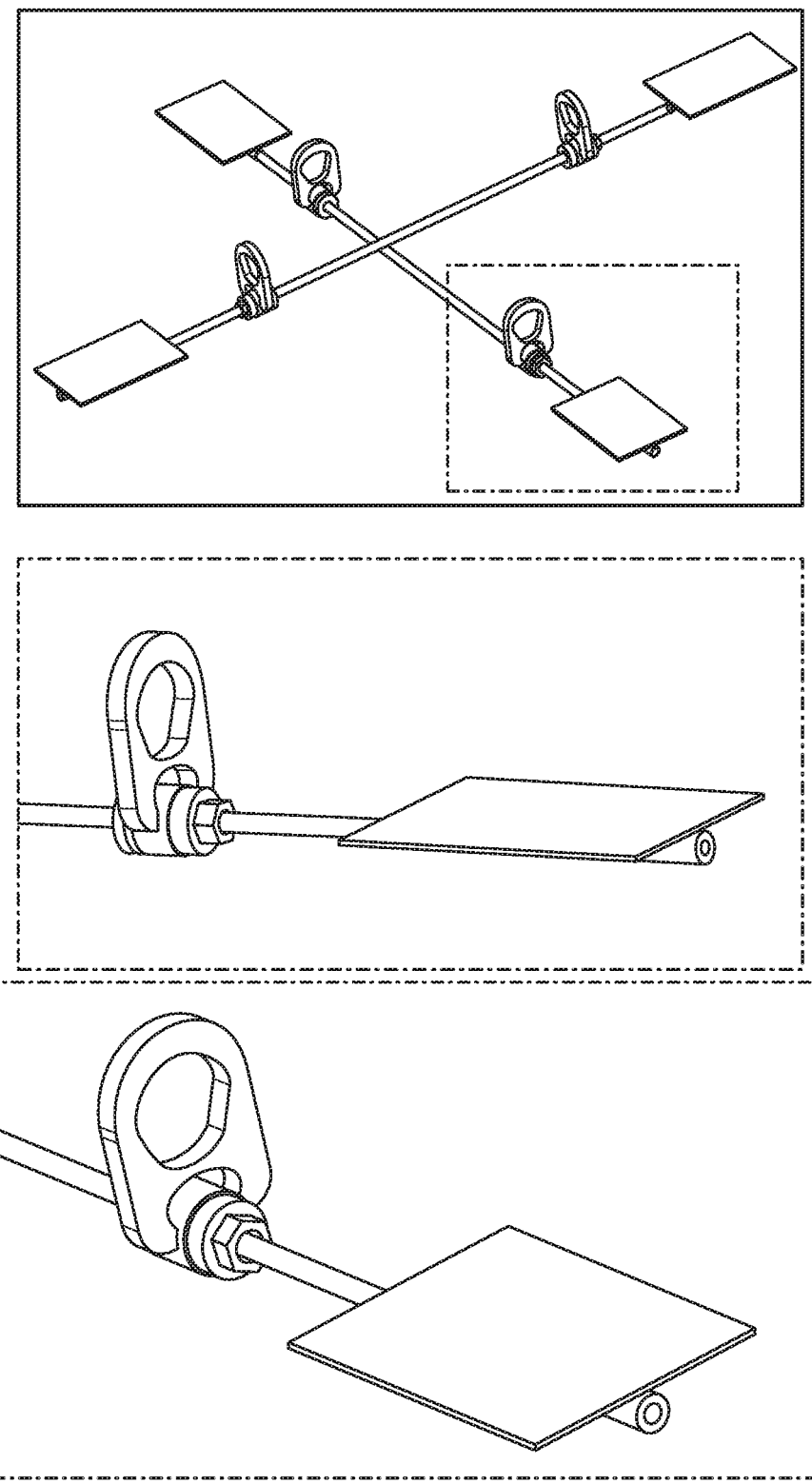
FIG. 6 is an illustration of the modular set up.
Figure 7:
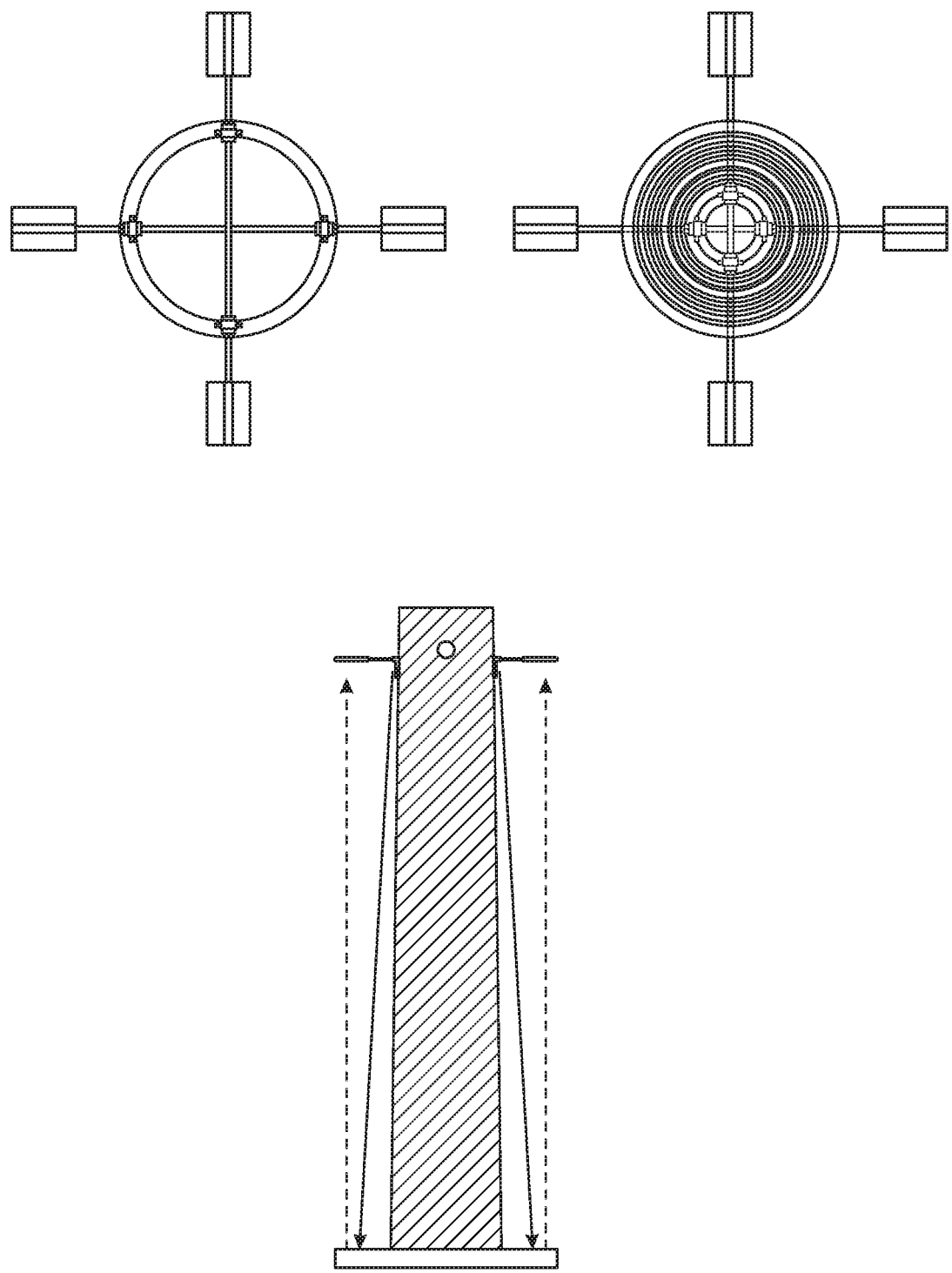
FIG. 7 is another illustration of the modular set up.
Figure 8:
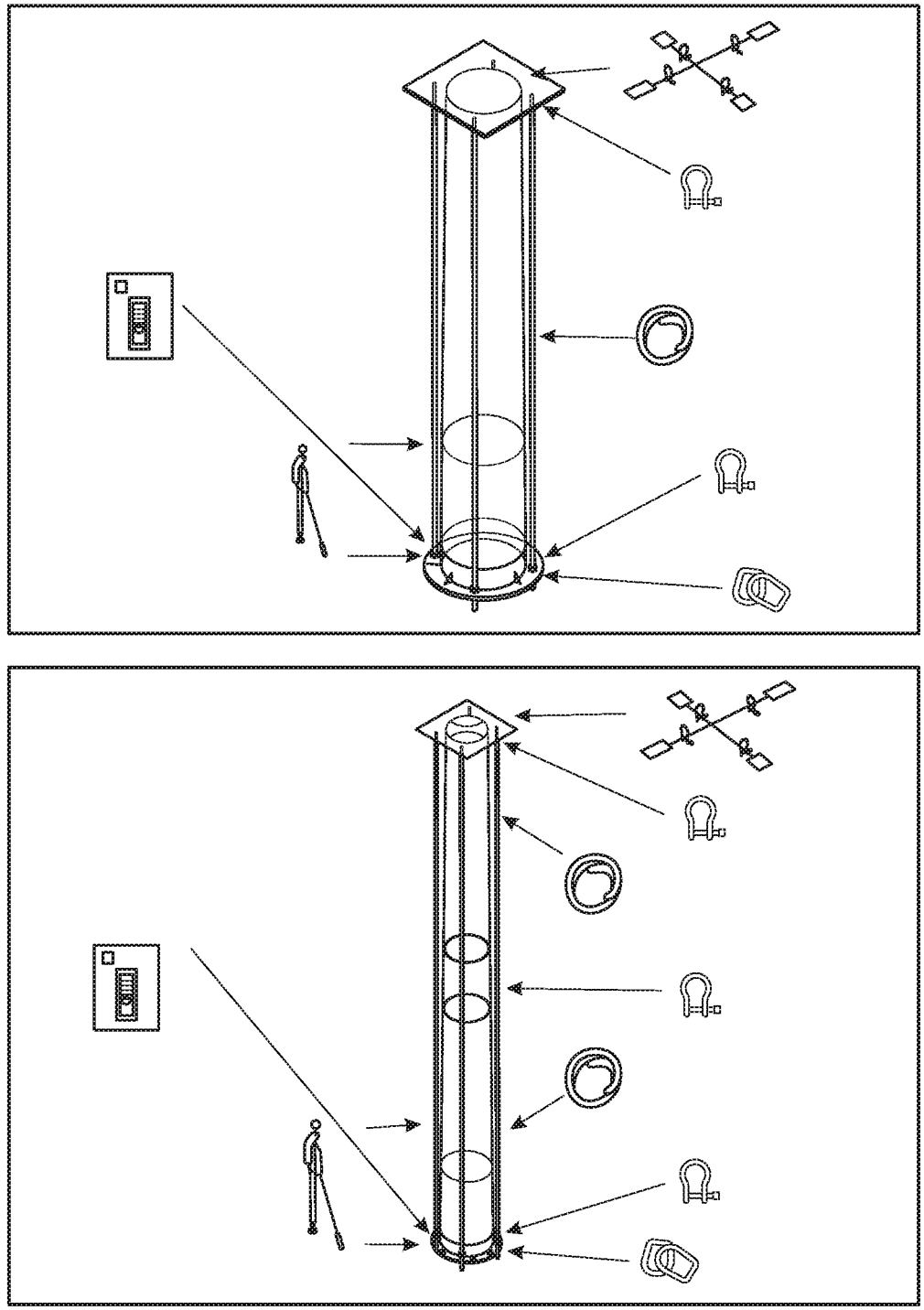
FIG. 8 is an illustration of the tower set up.

Once the segments are un-nested and laid out in sequence for assembly, it is recommended that the modules be set on "blocking" to keep the modules off the ground and debris out of the slip joints as illustrated in FIG. 6-8. Two blocks per segment is recommended. Pipe stands and assembly racks may also be used instead of wood blocks to elevate the modules to a comfortable working level. Any debris from the slip joint region should then be wiped clean especially inside the butt end of the smaller (upper) segment to be assembled where the tip of the larger (lower) segment will be inserted. Segments and bracket locations may then be marked or users may identify pre-existing marks.

Assembly racks may be the most efficient method to assemble the carbon fibers towers and enable complete tower assembly in as little as 10-15 minutes. These racks elevate the tower to a comfortable working height and using rollers facilitate quick easy assembly installation of brackets and accessories. Starting with the largest tower section to be assembled (be sure to position the butt of the base module where desired), the base smaller segment is slid off over the tip of the larger segments using alignment marks as a guide. There may be four quadrant axes on the segments with the elongated tip and base alignment marks on an axis. Alignment marks may typically appear as text with data including segment weight and serial number. In cases where the original alignment line printing has faded, the alignment marks appear as a single solid line. For this type of assembly, the base module should be set and plumbed first. The subsequent tower segments may then be lifted into place as a pre-framed single unit or assembled tower segments-by-tower segments, depending on preference and site conditions. A guide hole on the top and on the bottom section of the pole may also be used to remark a faded alignment line printing. If the tower is assembled vertically, the modules are still required to be "jacked together" using two 3 ton come-alongs, safety straps or chains and jacking lugs.

Next the users would attach and secure the tower segments lift-level kit to the top of tower section 8. The users would attach (4×) 20' guy cables to tower section lift-level kit at 4 specific locations. The users would then lift tower section 8 from the tower section lift-level kit with a crane and attach it to the tower base. The user would then attach the other end of the (4×) guy wires from tower section lift-level kit to the hook of a come-along tools at 4 locations. The users would then attach the other hook of the come-along to the base plate at 4 guywire jacking location.

It is recommended that three ton come-alongs are used to ensure that slip-joints are brought together properly. The users would then verify the spec for expected height, overlap, and required guy wire tension. The user can then start jacking the pull handle of the come-alongs one at a time using a cable tension meter to gauge proper tension is applied to the cables to ensure the tower section is plumb. The user will also use a distance meter at each jacking points from the base of the tower pointed straight up to the target plate of the lift-level kit. When the tower section is leveled, correct height and correct overlap, the user would remove the tower section lift-level kit The users would then attach the lift-level kit to the cables from the crane and disconnect the (4×) come-alongs from the (4×) guy wires for removal.

The user would then attach the level-lift kit to the next tower section and attach additional 20 ft (4×) guy wires with a shackle to extend the length of the jacking guy wires. Then the user will lift the tower section with the crane and attach it to the lower tower section. The users would then line-up the straight guideline marker on both top and bottom tower sections. The user would then attach the other end of the (4×) guy wires from tower section to the hook of a come-along tools.

Next the users would attach and secure the tower segments leveling plate to the top of tower section. The users would attach (4×) 20' guy cables to tower section leveling plates at four specific locations. The users would then lift tower section 8 from the tower section leveling plate with a crane and attach it to the tower base. The user would then attach the other end of the (4×) guy wires from tower section leveling plate to base plate at 4 locations. The users would then insert four jacking lugs, two jacking lugs per tower section, into the pre-drilled jacking lug holes on the tower section. Pre-drilled jacking lug holes may be located at 180 degrees to each other segments. The users would then ensure that the lugs are fully inserted and flush with the tower wall and oriented in the direction of the come along to prevent damage to the tower wall or jacking lug. The users would then wrap the jacking lug safety strap or chain around the tower section at each jacking lug location.

The users would then ensure that the strap or chain passes through the large hole in the jacking lugs. The users would then fasten the strap with the ratcheting device (or use the quick-link on the chain), the strap or chain should be as snug as possible but not tight (some minor slack is expected in the chain. The users would then attach come-alongs to the jacking lugs on both sides of the tower. It is recommended that 3 ton come-alongs are used to ensure that slip-joints are brought together properly. The users would then verify the spec for expected height and overlap gap. 9. When the tower section is leveled, correct height and correct overlap, the user would install the locks to keep the tower section secure and remove the tower section leveling plate. The users would then attach and secure the tower section leveling plate to the top of the tower section. The users would then attach (4×) 20' guy cables to the leveling plate at 4 specific locations. The steps may then be repeated till the tower is fully erected.

The tower section levels may be verified by using a Disto distance meter. There are 4 measuring points that must be measured while winching the 4 guys wires. The user may then continue winching the come-alongs jacks until the distance meter readings on all 4 jacking locations are equal, this will indicate that the tower section is plumb and level. A top cap may be placed on the top segment of an assembled tower and secured with four self-tapping 5/16" [8 mm] hex head screws to the tower using the pilot holes in the top cap.

Figure 9:
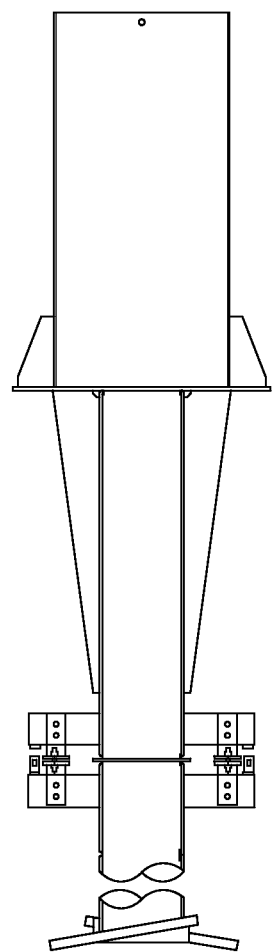
FIG. 9 is another embodiment of the modular set up.
Figure 10:
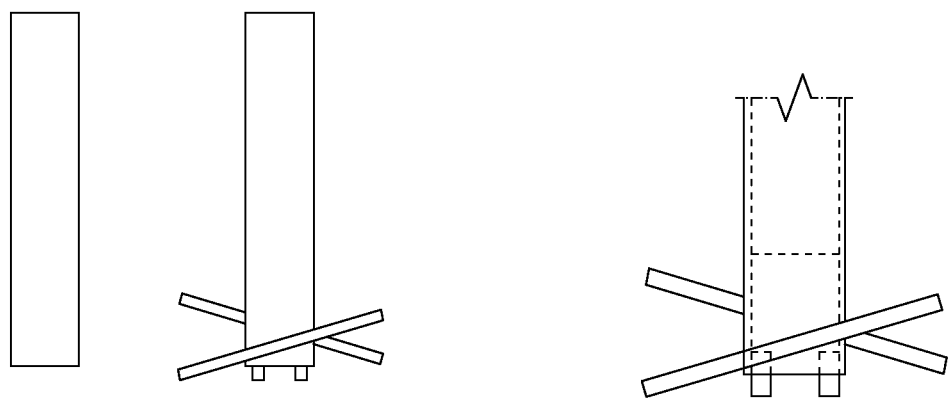
FIG. 10 is an illustration of the pile up.
Figure 11:
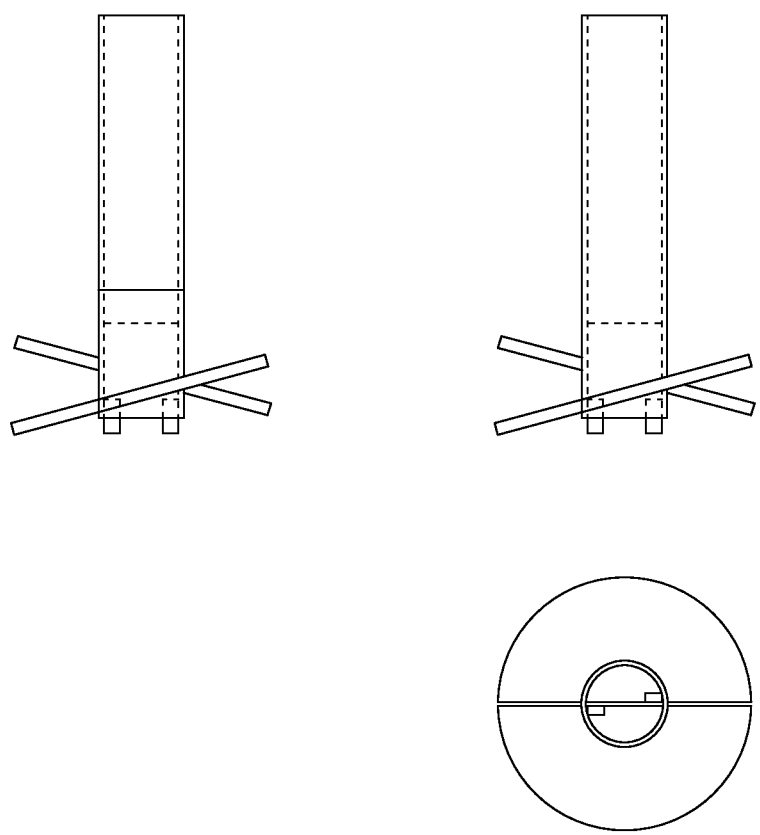
FIG. 11 is another illustration of the pile up.

In one or more non-limiting embodiments foundation shall be a single pile foundation supported by a bearing layer with an N value of 2 at GL-10.0m for the purpose of general area application as illustrated in FIGS. 9, 10, and 11. The pile construction method will be winged rotary penetrating steel pipe piles (AMZ Method Co., Ltd. Edge). Pile tip ground: N value 2 assumed Bearing capacity of steel pipe pile method AMZ method Pushing direction: Ministry of Land, Infrastructure, Transport and Tourism certified method TACP-0623 (sand/gravel)/TACP-0624 (clay) Extraction direction: Minister of Land, Infrastructure, Transport and Tourism certified method GBRC Performance Certification No. 20-14. Confirm that the N value of the bearing layer, which will be the tip of the pile, is 2 or more as a result of the boring survey by ground investigation. If the N value is 2 or less, the pile length shall be up to the layer where the N value is 2 or more.

The pile (A.M.Z pile) used in this construction method has a shape in which two semicircular wings are attached to the tip of a steel pipe (101.6 to 457.2), an assembly plate and an excavation blade are attached. The tip of the pile consists of a steel pipe (steel pipe at the tip), a blade, an assembly plate, I and an excavation blade. The tip is welded to the shaft steel pipe. There are two types of integrated type where the blade is directly attached. JIS G 3106 welded structural rolled steel (SM490A)-2017 is used for the I blade. If the thickness is 25 mm or more, chamfer the blade. JIS G 3101 general structural rolled steel (S 5400)-2017 is used for the assembly plate and drilling blade (auxiliary drilling blade). JIS G 3444 carbon steel pipes for general structures (STK400, STK490) 2016 will be used for the pile shaft steel pipes. JIS G 3444 carbon steel pipe for general structure (STK400, STK490) 2016 is used for the tip part steel pipe.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A method for making a carbon fiber pole, the carbon fiber pole having a plurality of segments, wherein the plurality of segments are cylindrical or conical in shape wherein the carbon fiber pole has an internal installation shaft provided therein to house one or more radio base stations, the method comprising the following steps in order:
   impregnating carbon fiber into resin and hardener to form a composite material;
   positioning the composite material into a filament winding process, wherein the filament winding process includes one or more mandrels that rotate and one or more carriage arms that travel horizontally up and down a length of the one or more mandrels which groups rovings of a winding pattern of the carbon fiber and dispenses the carbon fiber to the one or more mandrels at zero to five degrees;
   supplementing hoop winding of fiberglass on the one or more mandrels to be positioned on the composite material; and
   curing the composite material by placing the one or more mandrels and the composite material in a heating source wherein the one or more mandrels swell inside while the carbon fiber does not stretch as the fiberglass squeezes the resin to consolidate the carbon fiber.

2. A method for making a carbon fiber pole, the method comprising:
   forming a plurality of segments, wherein the plurality of segments are cylindrical or conical in shape wherein the carbon fiber pole has an internal installation shaft provided therein to house one or more radio base stations;
   cutting ends of a segment of the plurality of segments to form a hollow shape; and
   shaving an upper portion of the segment;
   conducting a filament winding process that includes a mandrel that rotates and one or more carriage arms that travel horizontally up and down a length of the mandrel which groups rovings of a winding pattern of carbon fiber and dispenses the carbon fiber to the mandrel;
   positioning the carbon fiber over the mandrel at zero to five degrees;
   impregnating the carbon fiber into epoxy resin and harder which later solidifies with the carbon fiber to create a composite material;
   supplementing 90 degree hoop winding of fiberglass to surround ends of the mandrel to be positioned on the composite material;
   curing the composite material by placing the mandrel and the composite material in an oven wherein the mandrel swells inside while the carbon fiber does not stretch to further consolidate the carbon fiber;
   assembling the plurality of segments at a final location;
   directly burying the carbon fiber pole in a ground by a foundation base which is bolted to the carbon fiber pole, the foundation base having a pile that is inserted into the ground and connected to the carbon fiber pole; and
   driving the foundation base into the ground, wherein the foundation base has two semicircular wings attached to a tip of a steel pipe.

* * * * *